US006957011B2

(12) United States Patent  (10) Patent No.: US 6,957,011 B2
Mitchell  (45) Date of Patent: Oct. 18, 2005

(54) VIDEO RECORDING APPARATUS

(75) Inventor: Colin Mitchell, Auckland (NZ)

(73) Assignee: Disposable Video Camcorders Limited, Auckland (NZ)

( * ) Notice: Subject to any disclaimer, the term of this patent is extended or adjusted under 35 U.S.C. 154(b) by 144 days.

(21) Appl. No.: 10/365,483

(22) Filed: Feb. 13, 2003

(65) Prior Publication Data

US 2003/0118328 A1  Jun. 26, 2003

Related U.S. Application Data

(63) Continuation of application No. 09/319,962, filed as application No. PCT/NZ97/00162 on Dec. 11, 1997, now abandoned.

(30) Foreign Application Priority Data

Dec. 13, 1996 (NZ) .................................. 299938

(51) Int. Cl.[7] ............................................. H04N 5/225
(52) U.S. Cl. ...................... 386/117; 348/373; 348/376; 358/906; 386/118
(58) Field of Search ........................ 386/46, 117, 121; 360/5; 358/906; 348/373, 376

(56) References Cited

U.S. PATENT DOCUMENTS

| | | | | |
|---|---|---|---|---|
| 3,836,691 A | * | 9/1974 | Wolfe | .......................... 396/395 |
| 3,860,937 A | * | 1/1975 | Wolfe | .......................... 396/27 |
| 4,442,462 A | | 4/1984 | Kimura | |
| 4,626,106 A | | 12/1986 | Hooper | |
| 4,641,182 A | | 2/1987 | Gur | |
| 4,651,233 A | | 3/1987 | Morisawa et al. | |
| 4,811,118 A | * | 3/1989 | Katoh et al. | ................... 386/38 |
| 4,870,401 A | | 9/1989 | Lee et al. | |
| 5,278,701 A | | 1/1994 | Kawarai et al. | |
| 5,337,891 A | * | 8/1994 | Toth | ......................... 206/316.2 |
| 5,400,185 A | * | 3/1995 | Scerbo, III | ...................... 360/5 |
| 5,689,733 A | * | 11/1997 | Zawodny et al. | ............... 396/6 |
| 5,832,311 A | * | 11/1998 | Zawodny et al. | ............... 396/6 |
| 6,021,811 A | * | 2/2000 | Hennessy | .................... 137/606 |

FOREIGN PATENT DOCUMENTS

| | | | | |
|---|---|---|---|---|
| AU | B-69974/91 | | 8/1992 | |
| DE | 41 08 307 A1 | * | 9/1991 | ............ H04N 1/00 |
| EP | 0 366 474 A1 | | 5/1990 | |
| EP | 0 496 142 A1 | | 7/1992 | |
| EP | 0 644 690 A2 | | 3/1995 | |
| EP | 0 721 144 A1 | | 7/1996 | |

* cited by examiner

Primary Examiner—Vincent Boccio
(74) Attorney, Agent, or Firm—Young & Thompson

(57) ABSTRACT

A low cost video recording apparatus for one time recording on a recording medium, comprises a casing (15) which houses a video cassette tape, a lens (1), a microphone (16), a colour CMOS sensor, a signal processing module, a write head and a drive unit, in operational relation to each other. Also provided is a view finder (21) and an operating switch (22). The casing (15) has formed thereon a tear strip (20) used for opening the casing once recording has been completed. Removal of the cassette tape also involves disabling of tape guide components. Since one time recording only is possible with no playback or rewind, the life requirements for the various components can be considerably reduced.

63 Claims, 4 Drawing Sheets

VIDEO RECORDING APPARATUS

TECHNICAL FIELD OF THE INVENTION

The present invention relates to a video recording apparatus. For convenience only the present invention will be described in relation to a form of a video tape recorder commonly referred to as a camcorder wherein information related to moving images is stored in a video tape, for which the invention may be particularly applicable. However, the invention is not limited to this and also covers for example forms of video recorders where a magnetic disc or compact disc or other suitable medium is used for storing the information.

BACKGROUND ART

Video recorders for recording moving images on a recording medium are well known, and recent advances in component miniaturisation have seen a marked reduction in size and cost of such devices together with an improvement in performance. Such devices however are still relatively expensive due in part to the requirement for reliability and long life of the components, and the complicated mechanism and extra components incorporated into most types of devices for providing loading and ejecting of the recording medium, and in the case of magnetic tape, rewinding of the recording tape, and playback from the recording tape of recorded images. Consequently due to the cost of current devices, someone wishing to occasionally make a video recording must either borrow or hire a video recorder, and handle this with care to avoid damage. It is also unwise to allow the video recorder to be used by children.

DISCLOSURE OF THE INVENTION

It is an object of the present invention to provide a novel video recording apparatus which addresses the foregoing limitations and inconvenience with conventional video recording devices, or to at least provide the public with a useful choice.

According to one aspect of the present invention there is provided a video recording apparatus comprising: a lens (or a device for mounting a lens); a light sensing device (or a device for mounting a light sensing device), for sensing an optical image focused by said lens (or a lens when mounted by said mounting device), and producing corresponding electrical output signals; a signal processing device, for processing said electrical output signals into information in a suitable format; a recording medium mounting device for mounting a removable recording medium; a write device for recording said processed information onto a removable recording medium; a casing for housing said components in operational relation to each other such that in use images from external objects are recorded by a recording medium mounted by said recording medium mounting device; and a device for limiting the useful life of one or more of said components other than the recording medium to that necessary to partially or fully fill said recording medium with information, or to that necessary to maintain the integrity of said video recording apparatus until the recording medium is to be removed.

The apparatus may further comprise a drive unit for driving in one direction a video tape recording medium when mounted by said recording medium mounting device.

According to another aspect of the present invention there is provided a video recording apparatus comprising: a lens (or a device for mounting a lens); a light sensing device (or a device for mounting a light sensing device), for sensing an optical image focused by said lens (or a lens when mounted by said mounting device), and producing corresponding electrical output signals; a signal processing device, for processing said electrical output signals into information in a suitable format; a removable video cassette tape recording medium for storing said processed information thereon; a video head unit for recording said processed information onto said removable video cassette tape recording medium; a drive unit for driving said video cassette tape recording medium to enable said storing of information; a casing for housing said components in operational relation to each other such that images from external objects are recorded by said video cassette tape recording medium with operation of said drive unit; and a device for limiting the useful life of one or more of said components other than the recording medium to that necessary to partially or fully fill said recording medium with information, or to that necessary to maintain the integrity of said video recording apparatus until the recording medium is to be removed.

In addition the apparatus may comprise an optical non electronic type view finder, and said drive unit may comprises a unidirectional drive, and said light sensing device may comprise a complementary metal oxide silicon (CMOS) sensor type integrated circuit.

Moreover the apparatus may comprise a roller which is secured by a retaining device to said casing in a recording position where it holds a tape of said cassette tape recording medium in proximity to said video head unit, and said device for limiting the useful life of one or more components involves release of said retaining device.

The release of said retaining device may involve melting of a portion of said retaining device using a heated element. Alternatively or in addition, the release of said retaining device may involve removal of an engaging member or may involve damage to or dislocation of said casing.

According to yet another aspect of the present invention there is provided a disposable video recording apparatus comprising: a lens, (or a device for mounting a lens); a light sensing device (or a device for mounting a light sensing device), for sensing an optical image focused by said lens, and producing corresponding electrical output signal; a signal processing device (or a device for mounting a signal processing device), for processing said electrical output signals into information in a suitable format; a write device for recording said processed information onto a recording medium; a recording medium for storing said processed information thereon; a drive unit for driving said recording medium to enable said storing of information; a casing for housing said components in operational relation to each other such that images from external objects are recorded by said recording medium with operation of said drive unit; and a device for limiting the useful life of one or more of said components other than said recording medium to that necessary to partially or fully fill said recording medium with information, or to that necessary to maintain the integrity of said disposable video recording apparatus until the recording medium is to be removed.

The term disposable is used herein to define a video recording apparatus which can only be used once, after which it is either thrown away, or must be returned to a specialised servicing centre for reconditioning and reloading with recording medium.

By providing a low cost video recording apparatus as described above, which is designed for making just a single recording on a recording medium, (either partially or fully filling the recording medium), the life requirements for the various components can be considerably reduced together with their cost, so that the apparatus can even be disposable. Moreover in the case of, for example, a video tape recording medium, there is no requirement for complicated mechanisms for rewinding the video tape and playback of the information recorded thereon. Furthermore, the design can be such that components are factory fitted relative to the tape, thus ensuring accurate alignment without the need for careful design, as with conventional video recorders. In addition, power requirements can be considerably reduced, and hence a low cost compact power unit can be used.

The lens may be similar to a lens such as used with a conventional video camcorder, with either manual or auto focus features. However, since the life of the lens need only be that required for recording of a single video tape, the lens may be made much more cheaply, and the structure for mounting the lens components can be less rigid, since there is no requirement for example to withstand rough handling over an extended period as with conventional video camcorder. Alternatively, there may be provided a device for fitting a lens, in which case a separate and perhaps more expensive lens may be fitted to the video recording apparatus, and removed after use. In this way, different types of lenses, for example wide angle, tele-photo, fish eye lenses may be used with the same basic video recording apparatus. Moreover cost of the basic unit may be reduced, so as to be more attractive to the consumer.

The light sensing device may comprise any suitable device which is able to convert optical information into electrical signals. For example this may comprise a charge coupled device (CCD) integrated circuit or a complementary metal oxide silicon (CMOS) sensor type integrated circuit. As with the lens, instead of incorporating the light sensing device into the video recording apparatus, there may be provided a device for mounting a light sensing device, in which case a separate and perhaps more expensive light sensing device may be fitted to the video recording apparatus, and removed after used. For example the light sensing device may be formed as one with the lens unit.

The signal processing device may comprise any suitable means whereby the electrical signals from the light sensing device are converted to a suitable format for recording on a recording medium such as video tape, magnetic discs, or compact disc. In the case of VHS or 8 mm recording tape, the signal processing device may include a device for converting to PAL or NTSC signal format. As with the lens, instead of incorporating the signal processing device into the video recording apparatus, there may be provided a device for mounting a signal processing device, in which case a separate and perhaps more expensive signal processing device may be fitted to the video recording apparatus, and removed after use. For example the signal processing device may be provided in a separate unit incorporating a lens and light sensing device, which is fitted to the video recording apparatus and removed after use.

The write device may comprise any suitable means whereby information processed by the signal processing device can be written onto a recording medium. For example in the case of a video tape recording medium, this may comprise a standard colour VHS head unit. This may also incorporate an audio recording function so that sound can be recorded at the time of recording the video information. In the case of a compact disc, this may comprise for example a device such as currently used for writing on magneto-optical discs. However, since the life requirements of the write device are minimal, other devices involving less complex technology and perhaps yet to be developed technology, may be appropriate. It is generally envisaged that the write device would be provided as an integral part of the video recording apparatus, and disposed therewith.

The drive unit for driving the recording medium to enable storing of information, may incorporate any suitable power source. For example this may comprise an electric motor with a speed control function to synchronise the movement of the recording medium with the image processing rate of the light sensing device. In the case of an electric motor, this may involve electrical control of the speed. In the case for example of a spring drive, speed control may involve for example an escapement mechanism such as used for clock mechanisms, or old type spring driven movie cameras. Since the recording medium is only driven to enable storing of information thereon, then the drive unit need only be capable of drive in one direction.

The casing may be of any suitable material and design whereby the components can be held in operational relation to each other for the life of the camera. For example this may be of low cost plastics or reinforced cardboard design, sufficient to withstand a minimal amount of rough handling.

The device for limiting the life of the components may involve any suitable arrangement whereby one or more components is disabled or made unusable. The main requirement for limiting the life being to ensure that the device cannot be reused, at least without some form of repair or component replacement or resetting, thus ensuring the limited life of some of the components is not exceeded, and the performance of the unit and quality of the recording is not compromised.

For example this may be achieved by a design wherein removal of the tape, or filing the recording medium to its planned capacity results in damage to one or more components. For example this may involve a timer with an LCD display which disables the video recording apparatus in some manner after the tape has been used for a specified time. Alternatively, this may involve a mechanism which is activated once the tape has been used, to damage or disable the CMOS sensor or some other essential component. For example in the case of a tape recording medium, to damage, release or relocate roller mounts to enable removal of the tape, or to prevent reloading of a tape cassette.

In one arrangement, the write device may involve a write head which is movable from a recording position where it is arranged in proximity to the recording medium for recording thereon, to a release position wherein the recording medium may be removed. This movement may be achieved for example by opening the casing, thereby changing the positional relationship between the write head and the recording medium. This may however be achieved after opening the casing to gain access to the recording medium, by manually removing the recording medium from proximity to the recording head. In one arrangement, removal of the recording medium from the drive head may only be achieved by damage to the drive head or associated components.

In the case of a video tape recording medium, the write device may involve a write head, and rollers for holding the tape against the write head. Release of the tape on completion of recording may involve disabling the roller mount so that the rollers can be moved to allow the tape to separate from the write head for subsequent removal from the video recording apparatus.

In a preferred form, the design may be such that at least the casing of the video recording apparatus must be damaged in some way so as to remove the recording medium from inside. In the case for example of a plastics or cardboard casing, this may involve breaking the casing open at a predetermined weakened region, for example along a tear strip.

The invention may also broadly be said to consist in the parts, elements and features referred to or indicated in the specification of the application individually or collectively, and any or all combinations of any two or more of said parts, elements or features, and where specific integers are mentioned herein which have known equivalents, these are deemed to be incorporated herein as if individually set forth.

Further aspects and advantages of the present invention will become apparent from the following description given in conjunction with the appended drawings.

BEST MODE FOR CARRYING OUT THE INVENTION

Figure 1:
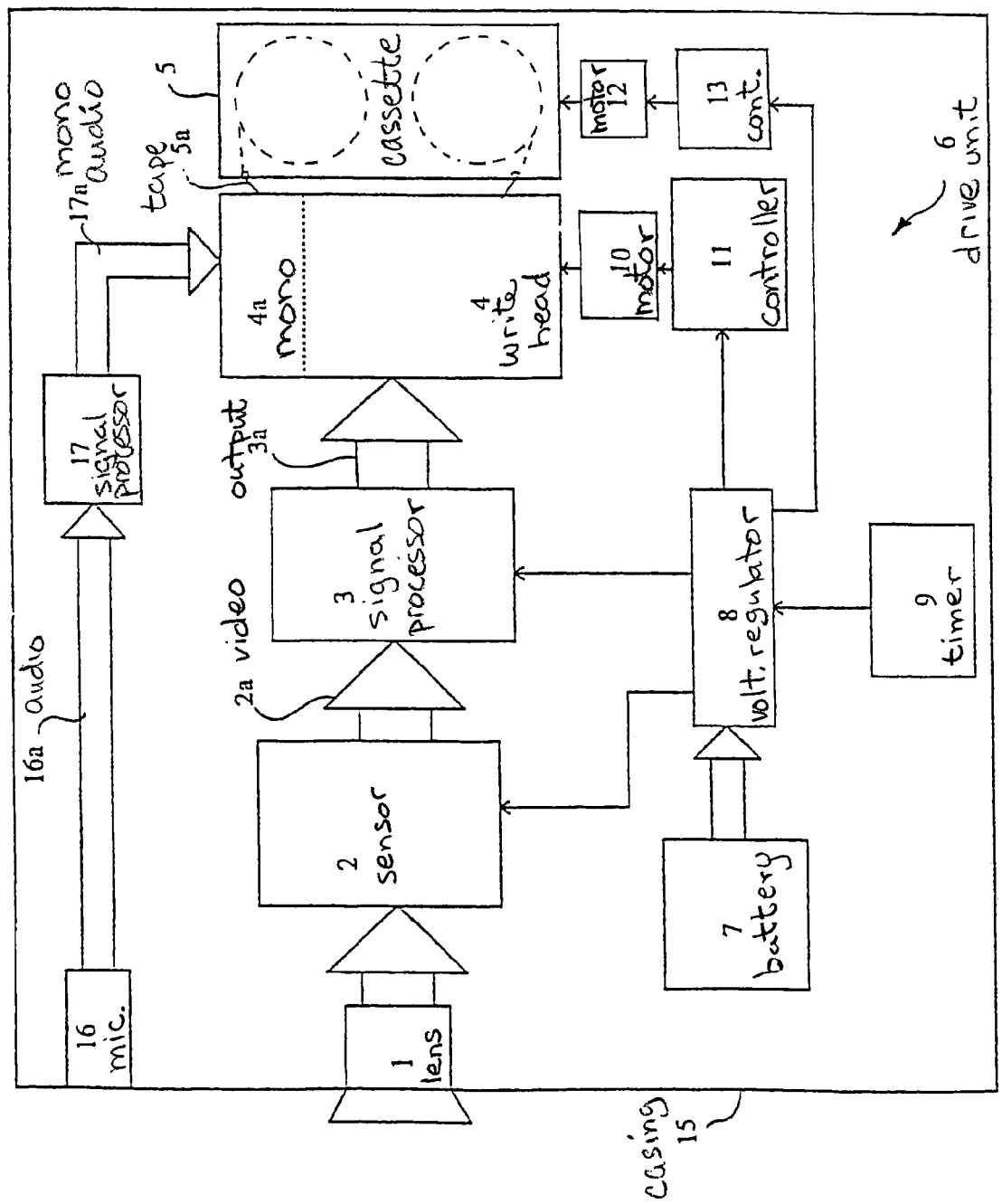
FIG. 1 is an overall block diagram of the arrangement of components of a video recording apparatus according to an embodiment of the present invention.

FIG. 1 is an overall block diagram showing the arrangement of components of a video recording apparatus according to an embodiment of the present invention. This embodiment is designed for use with a standard VHS video cassette tape. The components thus include as follows. A lens 1 of low cost construction having either manual or auto focus features. A colour CMOS sensor 2 with integrated camera functions serving as a light sensing device for sensing an optical image focused by the lens 1 and producing corresponding electrical output signals. The electrical signals in this case being for example 25/30 frames per second video signals 2a. An additional signal processing module 3 serves as a signal processing device for processing the electrical output signals 2a into information 3a in a suitable format. With this embodiment, the signal processing module 3 produces output signals in either PAL or NTSC video format. A two head colour VHS write head 4 with a single mono audio head 4a and tape guide assembly, serves as a write device for recording the processed information onto a recording medium. A VHS video tape cassette 5 is mounted adjacent to the write head 4, and a tape 5a thereof is held against the write head 4 by means of rollers of the tape guide assembly (to be described later), for storing the NTSC or PAL video output signals 3a from the signal processing module 3 and written thereon by the write head 4. A drive unit generally indicated by arrow 6, comprises a battery pack 7, a voltage regulator 8, a timer 9, a head motor 10, a head motor controller 11, a tape motor 12 and a tape motor controller 13. The components of the drive unit 6 are of similar design to corresponding components used in conventional video recorders, but without the stringent design requirements to ensure a long life and reliable operation. For example the battery pack 7 comprises four disposable 1.5 volt cells, and the other components may be made from low cost limited life components. A casing 15 schematically represented as a box outline, houses the abovementioned components in operational relation to each other such that images from external objects are focussed by the lens 1 onto the colour CMOS sensor 2 and subsequently recorded onto the tape 5a under control of the drive unit 6. Also provided is an audio microphone 16 connected to an audio signal processor 17 which processes audio signals 16a from the microphone 16, and outputs a mono audio signal 17a for recording together with the video signal 3a from the signal processing unit 3 onto the video cassette tape 5a by means of the audio head 4a.

Figure 2:
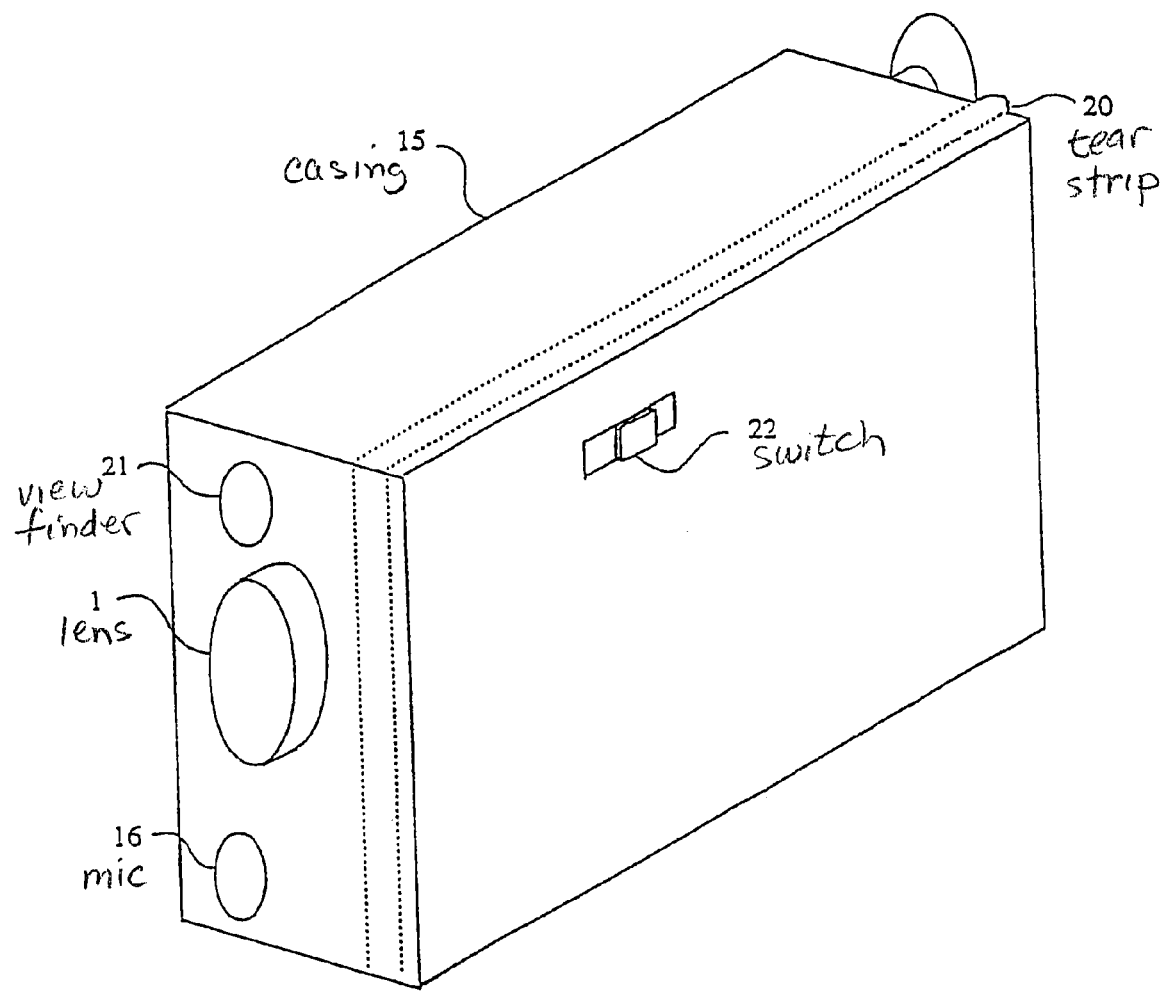
FIG. 2 is a schematic perspective view of an embodiment of the video recording apparatus, incorporating the components of FIG. 1.

FIG. 2 shows a schematic view of the video recording apparatus comprising the components of FIG. 1. Components the same as in FIG. 1 are indicated by the same symbols and description is omitted. As shown in FIG. 2, a view finder 21 of a simple optical non electronic construction is also provided in the casing 15 for aligning the video recording apparatus when taking a video picture. Also provided is an operating switch 22 for switching the drive unit 6 on and off.

The casing 15, which is made of a reinforced cardboard or plastics material, has formed thereon a tear strip 20. The tear strip 20 is used for opening the casing 15 when it is desired to remove the video tape cassette 5 for viewing on a separate playback device. Once the tear strip 20 is removed, the integrity of the casing 15 is damaged, and further recording is thus no longer possible. The tear strip 20 thus has the function of a device for limiting the useful life of the video recording apparatus, thus ensuring the limited life of some of the components is not exceeded, and the performance of the unit and quality of the recording is not compromised. Depending on design, in the case of a plastics material casing 15, a pull away section which can be removed to expose the interior of the casing 15 may be provided instead of the tear strip 20. Alternatively, a push button or lever arrangement may be provided. In this case, the casing may not necessarily be damaged with opening to remove the cassette, and instead some other component may be damaged. Due to the non requirement for reuse of components, the design may be simplified. For example to remove the tape cassette 5, mountings for the write head 4 may be damaged, for example with the opening of the casing 15, to separate the cassette tape 5a from the write head 4.

Figure 3B:
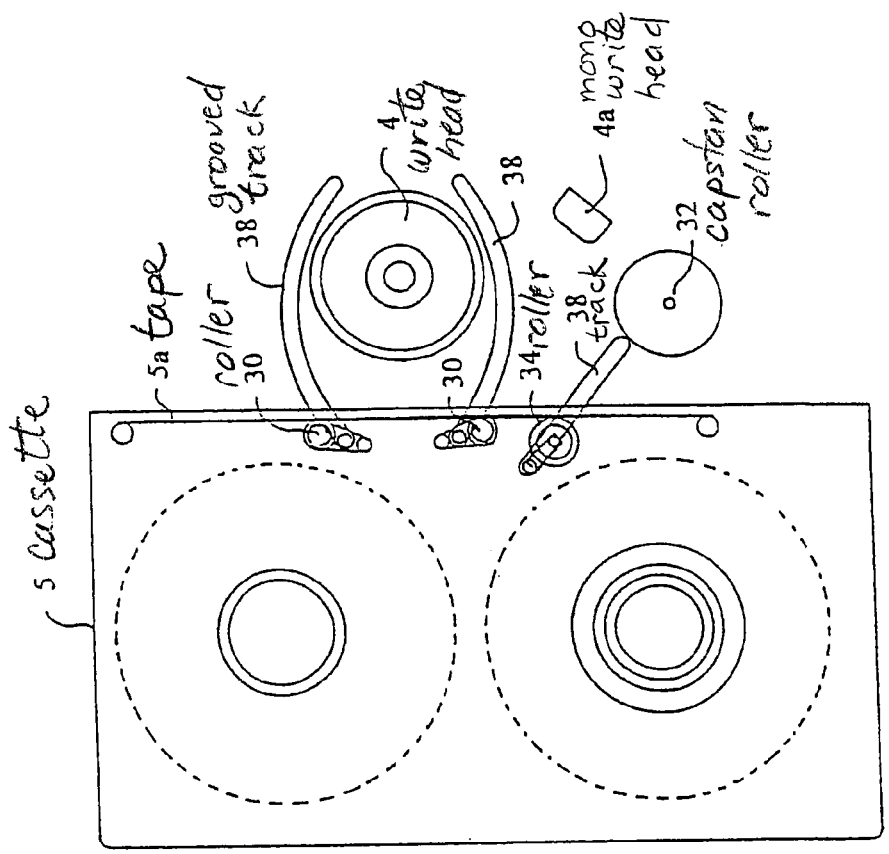
FIG. 3A and FIG. 3B are schematic diagrams illustrating a write head and tape cassette arrangement for the case where a tape recording medium is used, FIG. 3A showing a preloaded condition with a tape in a recording position, and FIG. 3B showing a cassette removal condition with the tape in a removal position.
Figure 3A:
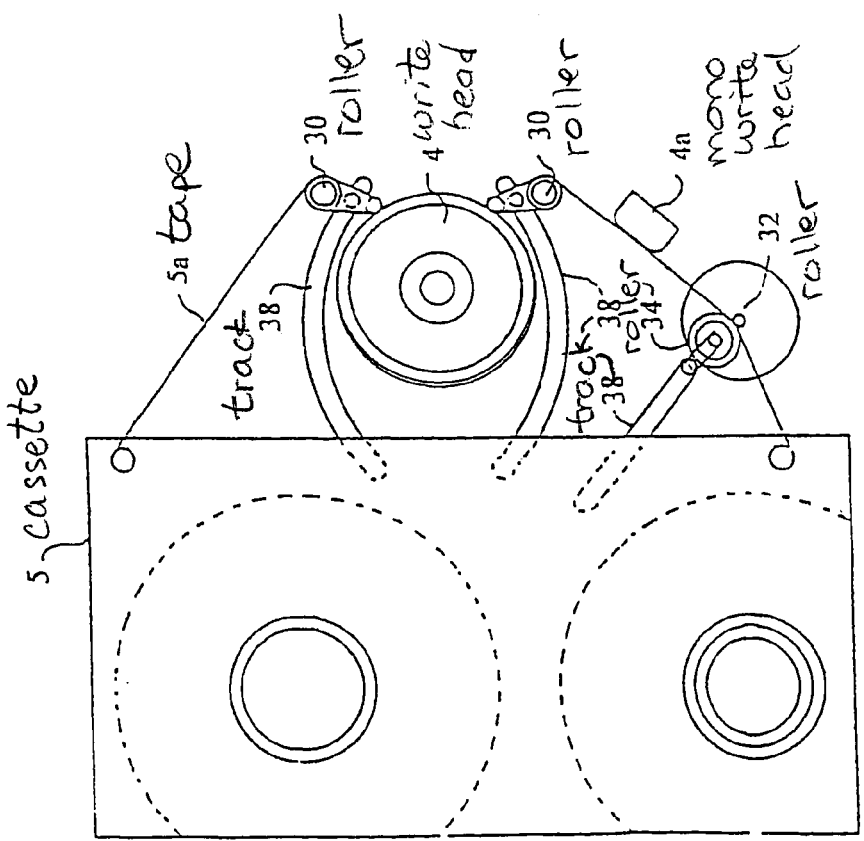

FIG. 3A and FIG. 3B show a possible arrangement for the VHS write head 4, the associated rollers and the tape cassette 5, FIG. 3A showing a preloaded condition with the tape 5a in a recording position, and FIG. 3B showing a cassette removal condition with the tape 5a in a removal position. Components similar to those in FIG. 1 are denoted by the same numeral. The tape 5a of the tape cassette 5 is held against the write head 4 by means of roller units 30. The tape 5a is also held against a capstan roller 32 by means of a capstan roller 34 for providing feedback control to synchronise the tape motor 12 (FIG. 1) with the head motor 10 (FIG. 1).

Since with the video recording apparatus according to the present invention, the tape 5a is pre-loaded, the roller units 30 and the capstan roller 34 are all fixed in position at the time of manufacture. Hence alignment of components can be insured with a simple design.

To remove the tape cassette 5 the tape 5a must be able to be withdrawn back into the body of the tape cassette 5 to the position shown in FIG. 3B. This corresponds to the tape removal condition which is achieved with standard video tape recorders by means of a complicated mechanism whereby the rollers are moved back to positions within the border of the cassette body.

Possible methods to enable removal of the tape cassette are given below.

Figure 4:
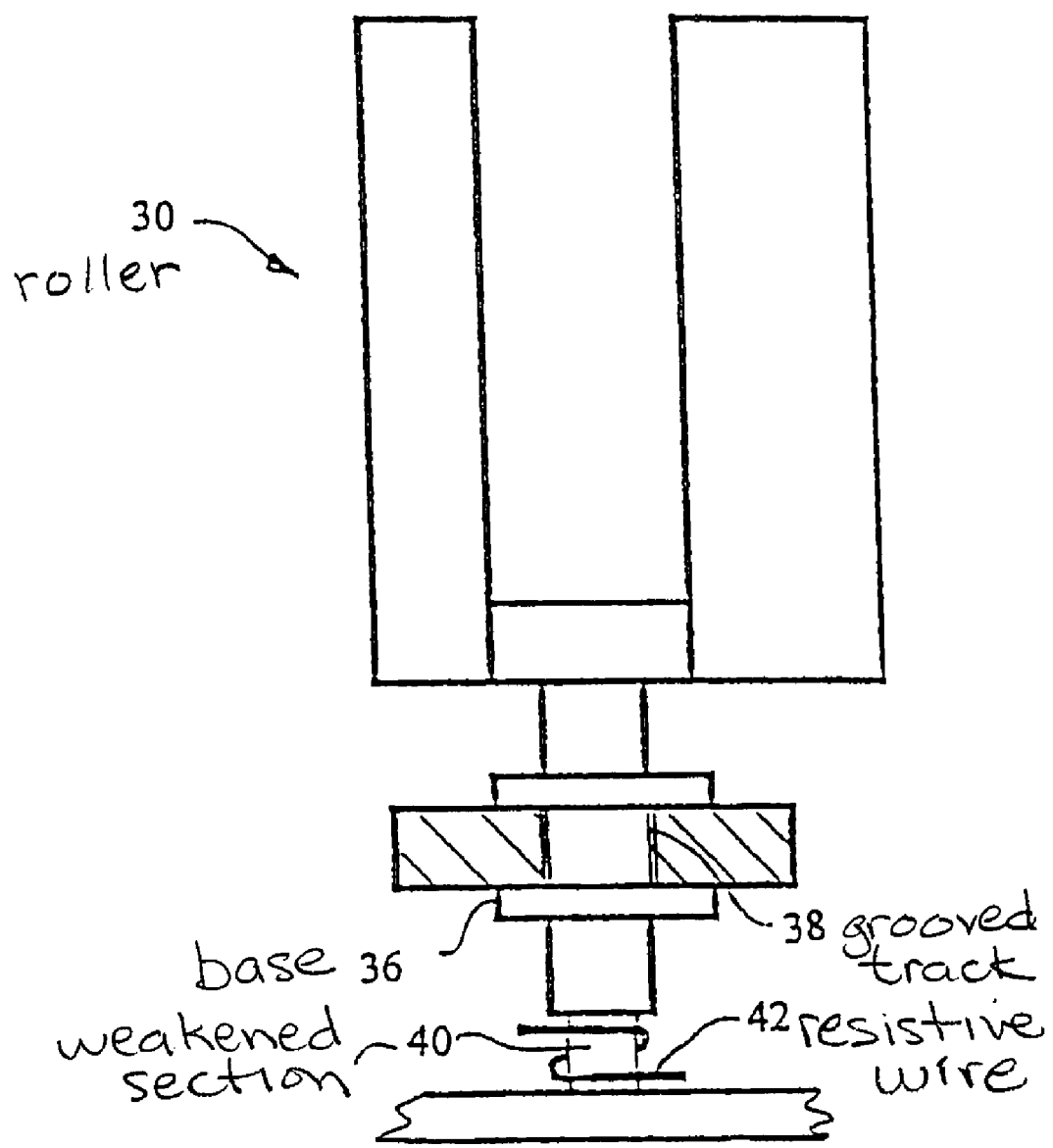
FIG. 4 is a schematic diagram illustrating a method of releasing tape guide rollers.

FIG. 4 shows details of one method wherein heated wires are used to cause failure of mountings for the roller units and capstan roller. Components the same as in FIG. 3 are indicated by the same symbols.

As typically shown in FIG. 4, the roller units 30 and capstan roller 34 (not shown) are each mounted on a base 36 which can slide along a grooved track 38 (FIG. 3). The bases 36 of the roller units 30 and capstan roller 34 are connected to the casing 15 of the video recording apparatus by weakened sections 40 which are wound with a resistive wire 42. Once recording is completed, a timer triggers a switch which allows current to flow through the resistive wires 42 which heat up and melt the weakened sections 40 severing the connection to the casing 15, so that the roller units 30 and capstan roller 34 can be slid along the grooved tracks 38 to the cassette removal position shown in FIG. 3B, under the winding up tension of the tape 5a.

As another method, the roller units 30 and capstan roller 34 may be held in position by a retaining device such as pins or the like instead of the weakened sections 40. The user would then remove the retaining device once recording was completed, thereby allowing the roller units 30 and capstan roller 34 to move to the cassette removable position. This arrangement may be preferable for situations where it is desired to recycle the video recording apparatus, since the roller mounts would not necessarily be damaged. Here the device for limiting the useful life of one or more of the components would involve the release of the roller units and capstan roller from their accurately aligned operating positions. Once released, the roller units and capstan roller could no longer be used until refitted in position in the factory at the time of fitting a new tape cassette.

Instead of releasing the roller units and capstan roller as described above, removal of the roller units and capstan roller could be achieved by providing a removable or sliding side panel to the video recording apparatus, on which the roller units and capstan roller are mounted, or to which the roller units are linked. Once recording is completed, this side panel could then be removed or slid by the user, taking with it the roller units and capstan roller or moving them to a release position, thus allowing the tape to be wound up by the drive motor. This method however would require more active participation on the user side, and may therefore be less desirable.

The above description of the embodiments is not to be taken as limiting to the scope of the invention and various other arrangements and combinations are also possible.

For example, although the lens 1 is described as being an integral unit with the casing 15, the invention is not limited to this arrangement. For example the casing 15 may be provided with a lens mounting, for mounting a separate lens. In this way, the versatility of the video recording apparatus may be increased, as different types of lens may be fitted as required or desired. Moreover, since such lenses need not be discarded with the video recording apparatus, these lenses may be more expensive, and incorporate functions such as a through the lens view finder, and a zoom function. Furthermore, depending on advances with technology, it may be feasible to incorporate some of the other components such as the light sensing device and the signal processing device of the video recording apparatus into the lens casing, and thus have these components also supplied separately.

Moreover, while the above embodiments have been described as using a magnetic tape as the recording medium, the invention is not limited to this and may instead use other recording mediums such as a compact disc or a magnetic disc.

In the above description reference has been made to known components currently used in video recording equipment. However, it is to be understood that due to the new field to which the invention is applicable, that is to say low cost video recording equipment, and to the rapid advance in recording technology, there may be other suitable components which have not yet been developed or considered, and the scope of the present invention is to be taken as including low cost video recording apparatus incorporating such components.

I believe the advantages of my invention to be as follows, however it should be appreciated that the following list is given by way of example only.

1. The video recording apparatus provides a low cost means for recording video pictures on conventional video recording medium such as a VHS or 8 mm video tape, which can then be played back on a separate video player.
2. Due to the low cost, and no maintenance requirements, the video recording apparatus can be sold at non specialised outlets, and can thus be more available to the public.
3. Moreover, due to the low cost, the taking of video pictures will be possible to those who have a video playback unit but have heretofore not been able to afford a video camera to take video pictures.
4. Furthermore, due to the low cost, the video recording apparatus can be used by children, thus increasing the market, and enabling an even lower cost.
5. The low cost construction allows the video recording apparatus to be disposable. In some versions however the video recording apparatus could be reused. For example the recording medium could be reloaded by a user using a special device or technique to reposition components.
6. The use of a CMOS light sensing device and unidirectional drive enables a significant reduction in costs and power requirements.

Finally it will be appreciated that the present invention has been described by way of example only, and that modifications and additions may be made thereto without departing from the scope of the invention as defined in the appended claims.

What is claimed is:

1. A video camera including a lens; a light sensing device for sensing an optical image focused by said lens and producing corresponding electrical output signals; a signal processor for processing said electrical output signals to information in a suitable format; and a recording medium and write system for writing said processed information on the recording medium; said light sensing device, signal processor, write device and recording medium being contained within a casing which also mounts the lens or means for mounting the lens, said casing being sealed at manufacture such that the recording medium cannot be removed without damage to the casing.

2. A video camera according to claim 1, wherein said sealed casing also contains a unidirectional drive system for driving a video tape or disc recording medium.

3. A video camera according to claim 2, further comprising a roller which is fixed in a recording position at manufacture of the camera, in which recording position said roller holds a video tape recording medium in position relative to a write head for recording on the video tape recording medium by said write head.

4. A video camera according to claim 3, wherein said roller is fixed n said recording position by a retainer which is releasable to enable removal of the tape by activating means arranged to melt a portion of said retaining means using a heated element.

5. A video camera according to claim 3, wherein said roller is fixed in said recording position by a retainer which is moved on opening of the sealed casing of the camera to enable removal of the tape.

6. A video camera according to claim 2, comprising a write head which is fixed in a recording position at manufacture of the camera, relative to said video tape or disc recording medium for recording on the recording medium by said write head.

7. A video camera according to claim 6, wherein said write head is fixed in said recording position by a retainer which is releasable to enable removal of the tape or disc recording medium after recording by activating means arranged to melt a portion of said retaining means using a heated element.

8. A video camera according to claim 6, wherein said write head is fixed in said recording position by a retainer which is moved on opening of the sealed casing of the camera to enable removal of the tape or disc recording medium.

9. A video camera according to claim 1, wherein the casing is molded from a plastics material and includes a line of weakness in the plastics material of the casing which must be broken to open the casing.

10. A video camera according to claim 1, wherein the casing includes a tear tab in the casing which must be removed to open the casing.

11. A casing according to claim 10, wherein an outer part of the casing is composed of cardboard.

12. A video camera according to claim 10, further comprising an optical non-electronic view finder.

13. A video camera according to claim 12, wherein said light sensing device comprises a complementary metal oxide silicon (CMOS) sensor type integrated circuit.

14. A video camera according to claim 1, wherein said sealed casing also contains a battery which is sealed in said casing at manufacture of the video camera as a power source for the video camera.

15. A video camera according to claim 1, wherein at least said lens and light sensing device are recyclable.

16. A casing according to claim 1, wherein an outer part of the casing is composed of a plastics material.

17. A video camera including a lens; light sensing device, for sensing an optical image focused by said lens and producing corresponding electrical output signals; a signal processor for processing said electrical output signals into information in a suitable format; a removable video tape or disc recording medium for storing said processed information thereon; a write device for recording said processed information on said video tape or disc recording medium; and a drive system for driving said video tape or disc recording medium; said video tape or disc being provided within a disposable casing of the apparatus at manufacture and wherein said drive system is a unidirectional drive system able to drive said tape or disc recording medium to medium to enable storing only, of said processed information.

18. A video camera according to claim 17, further comprising a roller which is fixed in a recording position at manufacture of the camera, in which recording position said roller holds a video tape recording medium in position relative to a write head for recording on the video tape recording medium by said write head.

19. A video camera according to claim 18, wherein said roller is fixed in said recording position by a retainer which is releasable to enable removal of the tape by activating means arranged to melt a portion of said retaining means using a heated element.

20. A video camera according to claim 18, wherein said roller is fixed in said recording position by a retainer which is moved on opening of the sealed casing of the camera to enable removal of the tape.

21. A video camera according to claim 17, comprising a write head which is fixed in a recording position at manufacture of the camera, relative to said video tape or disc recording medium for recording on the recording medium by said write head.

22. A video camera according to claim 21, wherein said write head is fixed in said recording position by a retainer which is releasable to enable removal of the tape by activating means arranged to melt a portion of said retaining means using a heated element.

23. A video camera according to claim 21, wherein said write head is fixed in said recording position by a retainer which is moved on opening of the sealed casing of the camera to enable removal of the tape.

24. A video camera according to claim 17, wherein the casing is molded from a plastics material and includes a line of weakness in the plastics material of the casing which must be broken to open the casing.

25. A video camera according to claim 17, wherein the casing includes a tear tab in the casing which must be removed to open the casing.

26. A casing according to claim 25, wherein an outer part of the casing is composed of cardboard.

27. A video camera according to claim 17, further comprising an optical non-electronic view finder.

28. A video camera according to claim 17, wherein said light sensing device comprises a complementary metal oxide silicon (CMOS) sensor type integrated circuit.

29. A video camera according to claim 17, wherein said sealed casing also contains a battery which is sealed in said casing at manufacture of the video camera as a power source for the video camera.

30. A video camera including a lens; a light sensing device for sensing an optical image focused by said lens and producing corresponding electrical output signals; a signal processor for processing said electrical output signals into information in a suitable format; a video tape or disc recording medium for storing said information thereon; and a write head for recording said information on said video tape or disc recording medium; said write head being fixed in a recording position at manufacture of the camera, relative to said video tape or disc recording medium for recording on the recording medium by said write head by a retainer which is damaged on opening of the casing of the camera to enable removal of the tape.

31. A video camera according to claim 30, wherein said write head is fixed in said recording position by a retainer which is releasable to enable removal of the tape by activating means arranged to melt a portion of said retaining means using a heated element.

32. A video camera according to claim 30, wherein a drive system for driving a video tape or disc recording medium comprises a unidirectional drive system able to drive said video tape or disc recording medium in one direction only.

33. A video camera according to claim 30, further comprising a roller which is fixed in a recording position at manufacture of the camera, in which recording position said roller holds a video tape recording medium in position relative to a write head for recording on the video tape recording medium by said write head.

34. A video camera according to claim 33, wherein said roller is fixed in said recording position by a retainer which is releasable to enable removal of the tape by activating means arranged to melt a portion of said retaining mean using a heated element.

35. A video camera according to claim 33, wherein said roller is fixed in said recording position by a retainer which is moved on opening of the sealed casing of the camera to enable removal of the tape.

36. A video camera according to claim 30, wherein the casing is molded from a plastic material and includes a line of weakness in the plastics material of the casing which must be broken to open the casing.

37. A video camera according to claim 36, further comprising an optical non-electronic view finder.

38. A video camera according to claim 37, wherein said light sensing means comprises a complementary metal oxide silicon (CMOS) sensor type integrated circuit.

39. A video camera according to claim 30, wherein the casing includes a tear tab in the casing which must be removed to open the casing.

40. A casing according to claim 39, wherein an outer part of the casing is composed of cardboard.

41. A video camera according to claim 30, wherein said sealed casing also contains a battery which is sealed in said casing at manufacture of the video camera as a power source for the video camera.

42. A video camera including a lens; a light sensing device for sensing an optical image focused by said lens and producing corresponding electrical output signals; a signal processor for processing said electrical output signals into information in a suitable format; and a recording medium and a write device for writing said processed information on the recording medium; the video camera also including means arranged on filling of the recording medium to a predetermined capacity with said information, to disable one or more of said light sensing device, signal processor, or write device.

43. A video camera according to claim 42, wherein a drive system for driving a video tape or disc recording medium comprises a unidirectional drive system able to drive said video tape or disc recording medium in one direction only.

44. A video camera according to claim 43, further comprising a roller which is fixed in a recording position at manufacture of the camera, in which recording position said roller holds a video tape recording medium in position relative to a write head for recording on the video tape recoding medium by said write head.

45. A video camera according to claim 44, wherein said roller is fixed in said recording position by a retainer which is releasable to enable removal of the tape by activating means arranged to melt a portion of said retaining means using a heated element.

46. A video camera according to claim 44, wherein said roller is fixed in said recording position by a retainer which is moved on opening of the sealed casing of the camera to enable removal of the tape.

47. A video camera according to claim 43, comprising a write had which is fixed in a recording position at manufacture of the camera, relative to said video tape or disc recording medium for recording on the recording medium by said write head.

48. A video camera according to claim 47, wherein said write head is fixed in said recording position by a retainer which is releasable to enable removal of the tape by activating means arranged to melt a portion of said retaining means using a heated element.

49. A video camera according to claim 47, wherein said write head is fixed in said recording position by a retainer which is moved on opening of the sealed casing of the camera to enable removal of the tape.

50. A video camera according to claim 42, wherein the casing is molded from a plastic material and includes a line of weakness in the plastics material of the casing which must be broken to open the casing.

51. A video camera according to claim 42, wherein the casing includes a tear tab in the casing which must be removed to open the casing.

52. A video camera according to claim 51, wherein an outer part of the casing is composed of cardboard.

53. A video camera according to claim 42, further comprising an optical non-electronic view finder.

54. A video camera according to claim 53, wherein said light sensing means comprises a complementary metal oxide silicon (CMOS) sensor type integrated circuit.

55. A video camera according to claim 42, wherein said sealed casing also contains a battery which is sealed in said casing at manufacture of the video camera as a power source for the video camera.

56. A video camera according to claim 42, wherein an outer part of the casing is composed of a plastics material.

57. A video camera including a lens; a light sensing device for sensing an optical image focused by said lens and producing corresponding electrical output signals; a signal processor for processing said electrical output signals into information in a suitable format; and a recording medium and write device for writing said processed information on the recording medium; said light sensing device, signal processor, write device and recording medium being contained within a casing which also mounts the lens or means for mounting the lens, which is arranged to actuate means to damage the light sensing device, signal processor, or write device on opening of the casing.

58. A video camera according to claim 57, wherein a drive system for driving a video tape or disc recording medium comprises a unidirectional drive system able to drive said video tape or disc recording medium in one direction only.

59. A video camera according to claim 57, wherein said write head is fixed in a recording position by a retainer which is moved on opening of the sealed casing of the camera to enable removal of the tape or disc recording medium.

60. A video camera according to claim 59, wherein the casing is molded from a plastic material and includes a line of weakness in the plastics material of the casing which must be broken to open the casing.

61. A video camera according to claim 60, wherein the casing includes a tear tab in the casing which must be removed to open the casing.

62. A video camera according to claim 59, further comprising an optical non-electronic view finder.

63. A video camera according to claim 57, wherein an outer part of the casing is composed of a plastics material.

* * * * *